United States Patent [19]

Panora

[11] Patent Number: 4,487,691
[45] Date of Patent: Dec. 11, 1984

[54] DEEP FAT FRYER WITH SWIVEL FILTER ELEMENT

[75] Inventor: Robert A. Panora, Milton, Mass.

[73] Assignee: Thermo Electron Corporation, Waltham, Mass.

[21] Appl. No.: 569,092

[22] Filed: Jan. 9, 1984

[51] Int. Cl.³ .............................................. A47J 37/12
[52] U.S. Cl. .................................. 210/167; 210/184; 210/DIG. 8; 99/408; 99/409
[58] Field of Search ................. 210/167, DIG. 8, 232, 210/238, 236, 460, 462, 184, 175, 419; 99/330, 403, 407, 408, 409, 416, 418

[56] References Cited

U.S. PATENT DOCUMENTS

| | | | |
|---|---|---|---|
| 2,212,905 | 8/1940 | Tota | 53/7 |
| 2,652,767 | 9/1948 | Childs | 99/408 |
| 3,209,678 | 10/1965 | Benson et al. | 99/406 |
| 3,410,199 | 11/1968 | Quednau | 99/403 |
| 3,472,155 | 10/1969 | Caridis et al. | 99/404 |
| 3,477,361 | 11/1969 | Bradshaw | 99/408 |
| 3,483,982 | 12/1969 | Nelson | 210/167 |
| 3,495,525 | 2/1970 | Piotrowski | 99/408 |
| 3,610,133 | 10/1971 | Mies, Jr. et al. | 210/DIG. 8 |
| 3,638,558 | 2/1972 | Bennett et al. | 99/408 |
| 3,646,882 | 3/1972 | Keating | 210/167 |
| 3,648,595 | 3/1972 | Morris | 99/408 |
| 3,667,374 | 6/1972 | Holmes | 210/167 |
| 3,685,433 | 8/1972 | Cunningham | 99/408 |
| 3,701,313 | 10/1972 | Boggs | 99/330 |
| 3,735,693 | 5/1973 | Pelster et al. | 99/408 |
| 3,750,560 | 8/1973 | Holmes | 99/408 |
| 3,797,378 | 3/1974 | Morris | 99/408 |
| 3,869,972 | 3/1975 | Chase | 99/410 |
| 3,894,482 | 7/1975 | Murphy | 99/330 |
| 3,970,558 | 7/1976 | Lee | 210/167 |
| 4,026,804 | 5/1977 | Keating | 210/167 |
| 4,328,097 | 5/1982 | Whaley et al. | 210/DIG. 8 |
| 4,444,095 | 4/1984 | Anetsberger et al. | 99/408 |

*Primary Examiner*—Richard V. Fisher
*Assistant Examiner*—Wanda L. Millard
*Attorney, Agent, or Firm*—Herbert E. Messenger

[57] ABSTRACT

Disclosed is a deep fat fryer with a filtration system to continuously filter liquid cooking fat circulated by a pump. A fryer filter with a filter element of material such as carbon-impregnated cloth is located in the bottom of a fry tank and is rotatable about a swivel joint between a horizontal operating position and a vertical servicing position. In the vertical position the upper end of the filter is above the surface of the fat in the fry tank and the filter element may readily be replaced without draining the tank and without risk of leakage of fat.

5 Claims, 14 Drawing Figures

DEEP FAT FRYER WITH SWIVEL FILTER ELEMENT

CROSS REFERENCE TO RELATED APPLICATION

Some of the subject matter disclosed herein is also disclosed in copending U.S. application Ser. No. 569,125, "High Efficiency Deep Fat Fryer", filed Jan. 9, 1984, in the name of James R. Hurley et al, and assigned to the assignee of record herein.

BACKGROUND OF THE INVENTION

This invention relates to apparatus for frying foods and particularly to improved deep fat fryers wherein the fat is circulated and filtered.

Deep fat frying of foods such as potatoes, meats, fish and pastries is performed by immersing the foods in a vessel containing heated cooking oil or fat. Of considerable importance in such fryers are their systems for heating the fat and for maintaining its temperature uniformity and cleanliness.

Heating systems of deep fat fryers are generally of three types. Some heaters comprise gas-fired burner tubes or electric elements immersed in fat held within the fryer vessel. A second category of fryer heaters includes systems which apply heat to fat in the fryer vessel by exposing the vessel to combustion gases or the condensible vapors of a heat pipe working fluid. A third type of heater includes a heat exchanger external to the fryer vessel through which fat is circulated, sometimes after passage through a filter.

Present deep fat fryers have one or more drawbacks or undesirable aspects. For example, commercially available fryers have relatively low efficiencies and, if gas-fired, have high flue losses. Typical calorimetric efficiencies for available gas-fired fryers are in the range of 40-60 percent.

Prior art fryers which circulate fat for external heating may utilize substantial energy in pumping the fat, particularly if a filter is included in the circulation system. Replacement or cleaning of filters in such units can be difficult, messy, and time-consuming, and clogging or blockage of the filters requires an immediate shutdown of the fryer.

It is a primary object of the invention to provide a deep fat fryer with an improved filtration system.

It is an object of the invention to provide a deep fat fryer with filtration whose filter minimizes risk of leakage of cooking fat during operation of the fryer and changing of the filter element.

It is also an object of the invention to provide a deep fat fryer whose filter element may be easily changed without the use of shutoff valves or the need to drain the fryer tank.

SUMMARY OF THE INVENTION

The invention concerns a deep fat fryer with an improved filtration system in the bottom of a fry tank. The filter provides continuous filtration of fat returning to the tank through an external loop such as one of two circulation loops arranged in parallel between external pump means and a reservoir of fat in the tank. A swivel joint permits rotation of the filter between a horizontal operating position and a generally vertical position in which the upper end of the filter is above the surface of fat. This facilitates replacement of a filter element without drainage of the tank or use of shutoff valves, and without risk of leakage of fat.

A preferred fryer filter includes a perforated casing of generally flattened cylindrical shape and a filter element of carbon-impregnated cloth or other cloth or filtration medium mounted adjacent to the inner surface of the casing. Opposed ends of the filter casing are sealed around a pipe through one end of which fat is delivered to the filter from a pump positioned below the tank. The other end of the pipe is closed and fitted with a fastener such as a nut which may be removed in order to replace the filter element.

DESCRIPTION OF PREFERRED EMBODIMENTS

Figure 1:
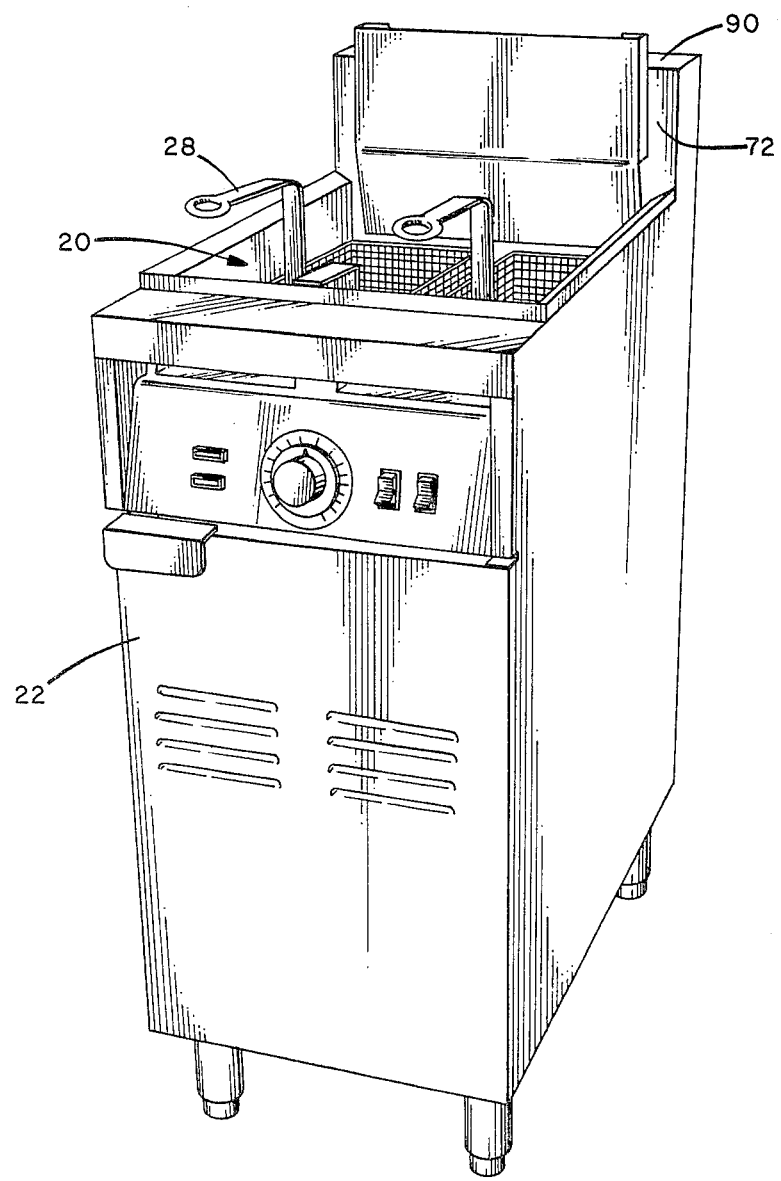
FIG. 1 is a view in perspective of a deep fat fryer according to the invention.
Figure 2:
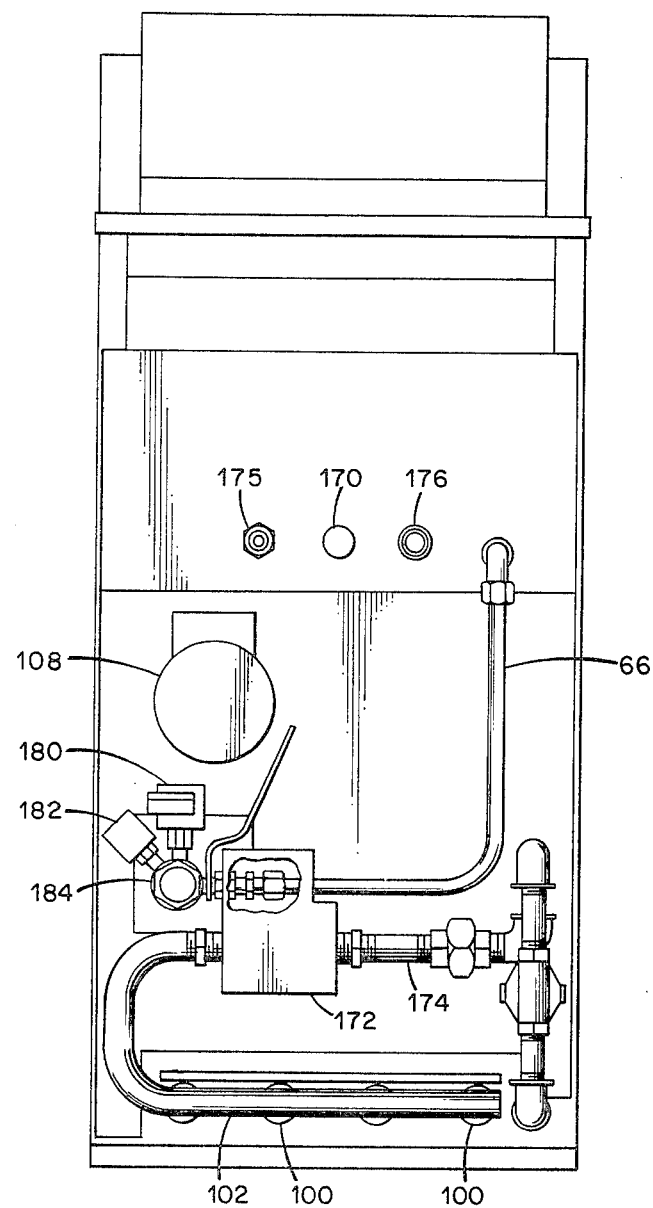
FIG. 2 is a front end view, partly broken away, of the fryer of FIG. 1.
Figure 3:
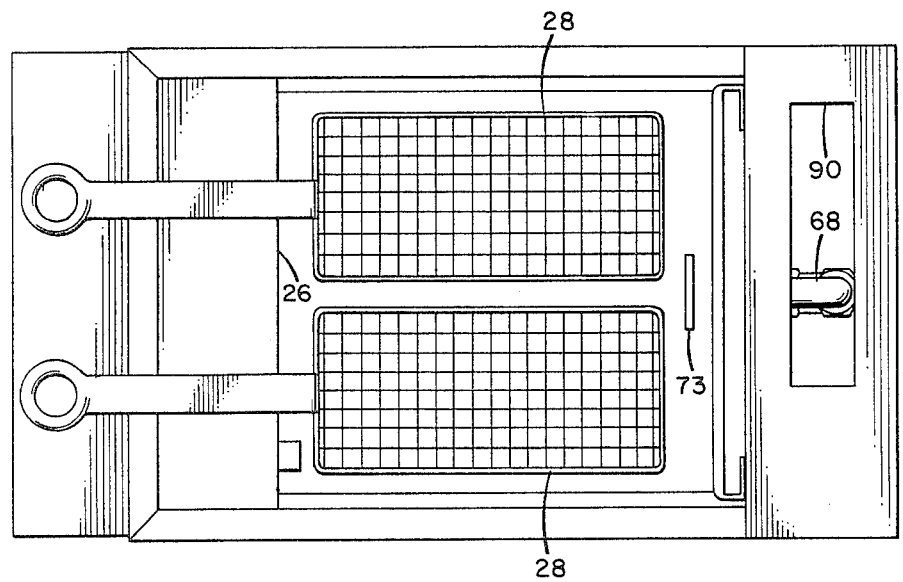
FIG. 3 is a top view of the fryer of FIG. 1.
Figure 4:
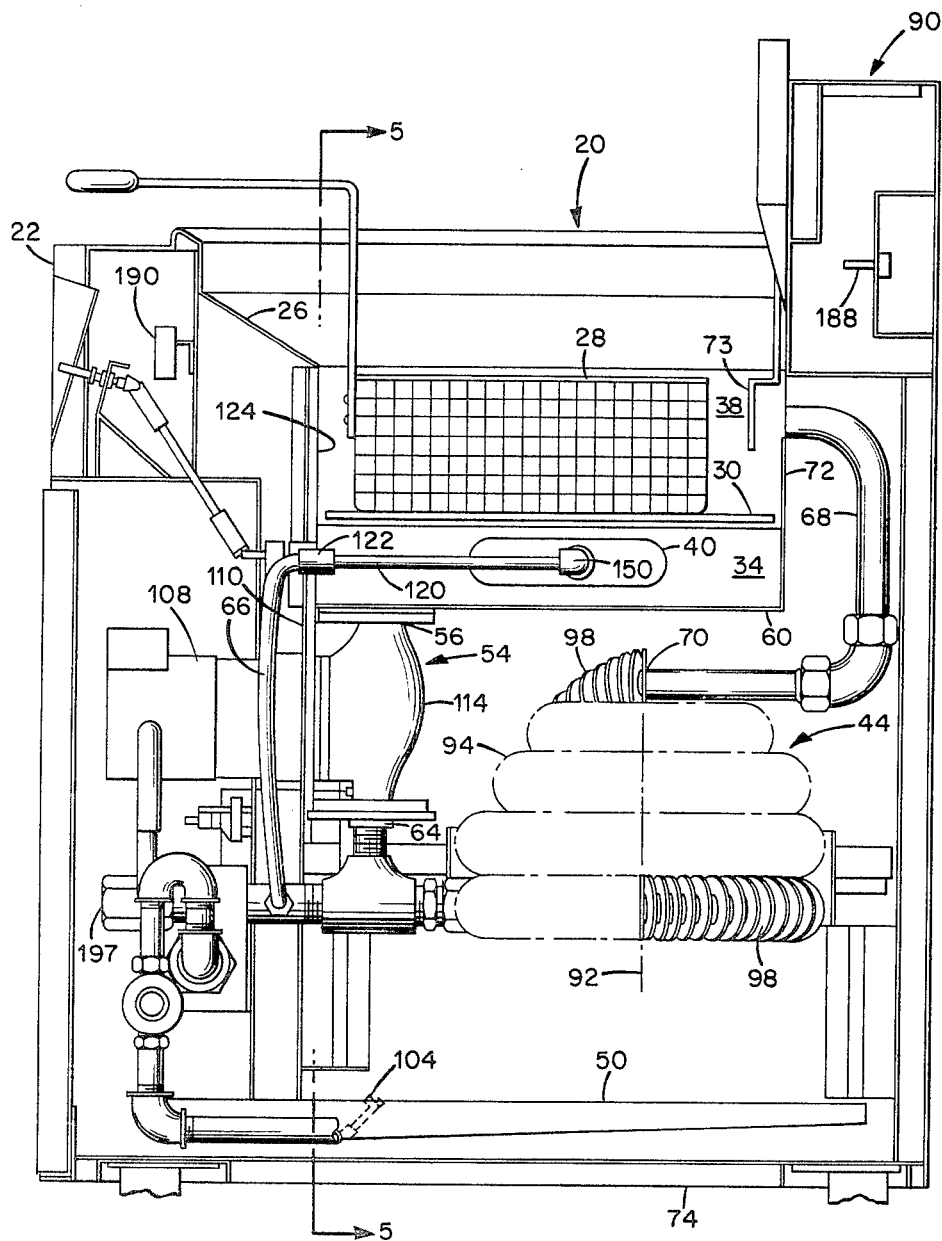
FIG. 4 is a side view, partly in section, of a preferred fryer such as the fryer of FIG. 1 having a helical-shaped heat exchanger.

A preferred deep fat fryer illustrated in FIGS. 1-5 includes a vessel or fry tank 20 housed within an open-topped cabinet 22. The tank 20 is adapted to hold a cooking oil or other cooking liquid (hereafter referred to as "fat") up to a level of approximately the lower edge of an inclined shelf 26 and to also accommodate a wire basket or other food holder for immersion into fat contained within the tank 20. Portions of two typical baskets 28 are shown in FIGS. 3 and 4. A crumb tray or grate 30 divides the fat-holding portion of the tank 20 into a bottom zone 34 and an upper, or fry, zone 38 which is unobstructed and of sufficient depth for immersion of food held by the basket. The bottom zone 34 carries a filter 40 through which a portion of the fat is continuously circulated as described later in this specification.

Outside of, and preferably below, the fry tank 20 are a heat exchanger 44 and a burner 50 which are used to maintain the temperature of the fat at a desired level such as about 350° F. A pump 54 is connected to the fat-holding portion of the tank 20, for example, by mounting its inlet 56 to the bottom wall 60 of the tank, and is operable to withdraw fat from the tank for heating and filtration. Between the pump outlet 64 and the tank are two return loops each adapted to return part of the outflow of fat from the pump to the tank. One loop comprises a return pipe 66 connected to the inlet of the filter 40 in the bottom zone 34 of the tank. The other return loop is adapted to direct flow to the heat exchanger 44 and includes a pipe 68 to carry fat from the heat exchanger outlet 70 back to the tank 20. This parallel flow arrangement permits continuous filtration of the fat at modest power requirements and avoids the need for immediate shutdown of the fryer in the event of clogging of the filter.

Figure 5:
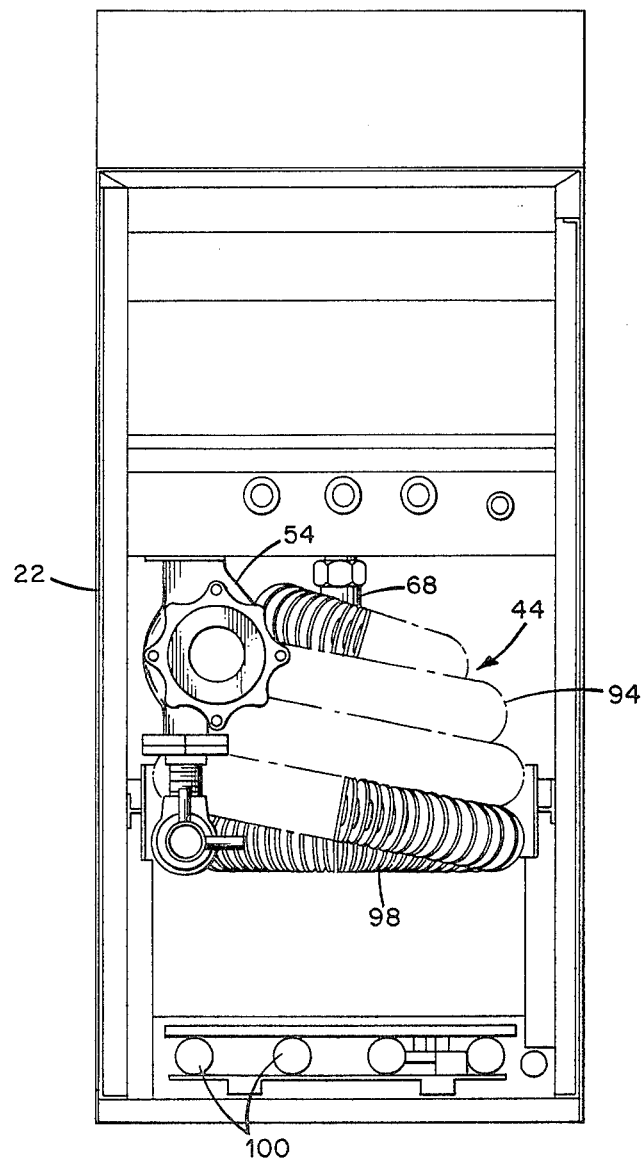
FIG. 5 is a cross-sectional view taken along the line 5—5 of FIG. 4.

As is shown in FIGS. 4 and 5, the pipe 68 which returns fat from the heat exchanger 44 to the fry tank 20 is connected to the rear wall 72 of the tank 20 at an upper, central location so as to discharge fat into the fry zone 38 as turbulent jets directed towards the opposite (front) end of the tank 20. This directional flow and a high flow rate of fat, up to about ten gallons per minute for a fry tank having a working volume of about seven gallons or fifty pounds of fat, provides jetting action and highly turbulent flow in the tank 20 which provides improved cooking of foods such as French fries. One observed benefit of the jetting action or forced convection through the baskets has been more uniform frying of foods held by the baskets. This permits, in fryers of the present invention, greater loading of the baskets—up to 7-8 pounds of fries per pair of baskets as compared to a typical loading of 3-4 pounds for conventional fryers—without risk of incompletely-cooked fries in the interior or central portions of the baskets. Also, the jetting action permits cooking at a slightly reduced fat temperature, e.g. at about 10° F. lower than would otherwise be maintained. The lower temperature prolongs useful life of the cooking fat and reduces consumption of fuel.

A deflector 73 may be provided near the point of discharge of the pipe 68 to prevent upward components of the turbulent jet flow from causing spattering or spraying of fat from the upper surface of fat held in the tank 20. Strong upward flow components, though not usually present during cooking operation, can occur if excess moisture becomes mixed with fat circulated through the heat exchanger 44 and forms steam which expands rapidly when the mixture is jetted into the tank through the pipe 68. The deflector 73 (see FIGS. 3 and 4), which may be a rectangular plate extending across a portion of the width of the fry tank 20 and attached to an upper portion of the tank rear wall 72, acts as a guard to deflect flow downward and sideways away from the upper surface of the fat. The deflector plate 73 also increases turbulence as the main flow of fat is deflected sideways and downward around its edges for passage through the two adjacent fryer baskets 28.

Figure 6:
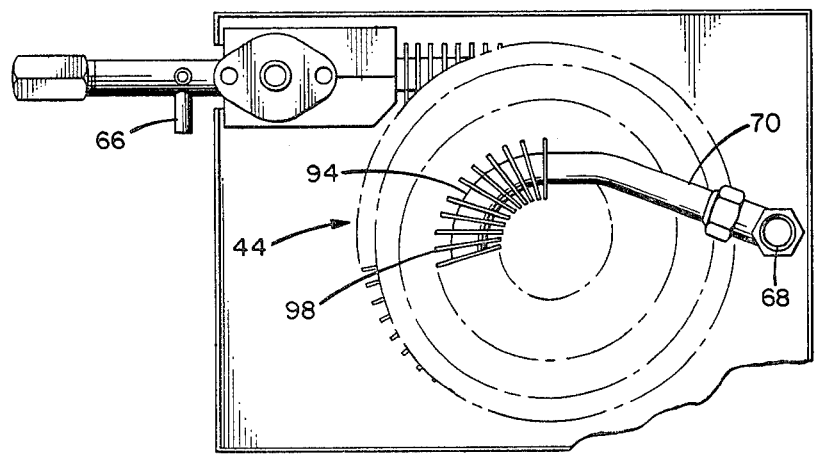
FIG. 6 is a top view of the helical-shaped heat exchanger of the fryer of FIG. 4.

The heat exchanger 44, which is formed in the shape of a helix in the embodiment shown in FIGS. 4-6, is mounted between the tank bottom wall 60 and the burner 50 positioned near the base 74 of the cabinet 22. With this arrangement, upwardly directed combustion products from the burner 50 pass into contact with outer surfaces of the heat exchanger 44 to heat fat being circulated therethrough. The combustion products also transfer heat by contact with the bottom wall 60 and the rear wall 72 of the fry tank 20 as these gases flow towards the exhaust 90 located in the upper rear portion of the fryer.

A preferred heat exchanger 44 is a coiled, helical-shaped tube whose central axis 92 is substantially vertical. The radii of the heat exchanger coils 94 relative to the axis 92 decrease with increasing axial distance from the burner 50 as shown in FIG. 4 in order to expose a maximum amount of surface of the heat exchanger 44 to the combustion products yet permit upward flow of combustion products between its coils. To further promote heat transfer, external fins such as ring-shaped fins 98 may be brazed or otherwise bonded to, or held in good thermal contact with, the outside of the heat exchanger 44 along all or a portion of its length. Suitable material for the fins 98 is a low carbon steel, and a preferred material for the tube forming the heat exchanger coils 94 is stainless steel.

The burner 50 may be a gas-fired lanced-port burner having one or more pipes 100 (for example, four are shown in FIG. 5) each connected to a manifold 102 and having a row of perforations along its upper portion facing the heat exchanger 44. Atmospheric lanced-port burners are preferred because of their simplicity, low cost, and quiet operation. The lanced-port burner 50 does not need a blower to provide air for combustion but instead entrains its combustion air. Also, the burner 50 is compatible with a system which does not require a forced draft fan to remove flue gases from the fryer. A gas pilot 104 is suitable for ignition of the burner 50; alternatively, a spark igniter may be used.

Withdrawal and circulation of the fat external to the tank is accomplished by means of the pump 54 which may be a centrifugal pump whose inlet 56 is bolted to the tank bottom wall 60. A preferred pump (FIG. 4) has a magnetically coupled motor 108 and an impellor (not shown). This permits separation of these components by a heat wall 110 so that although the impellor housing 114 is contacted by combustion products of the burner 50, the pump motor 108 is not exposed to these high temperature gases.

FIGS. 4, 10-12 show a preferred filter 40 for removing fat breakdown products (chiefly fatty acids) and particulate matter from the fat during its circulation. Filtration increases the useful life of the fat, saving costs associated with replacement of the fat, including loss of fryer operating time.

The filter 40, which is positioned in the bottom zone 34 of the tank 20, may (as illustrated herein) have a generally flattened cylindrical shape. At one end an inlet 116 is provided to receive fat from a conduit 120. The conduit 120 in turn communicates with the return pipe 66 through a swivel fitting 122 which extends through the front wall 124 of the fry tank 20.

Figure 10:
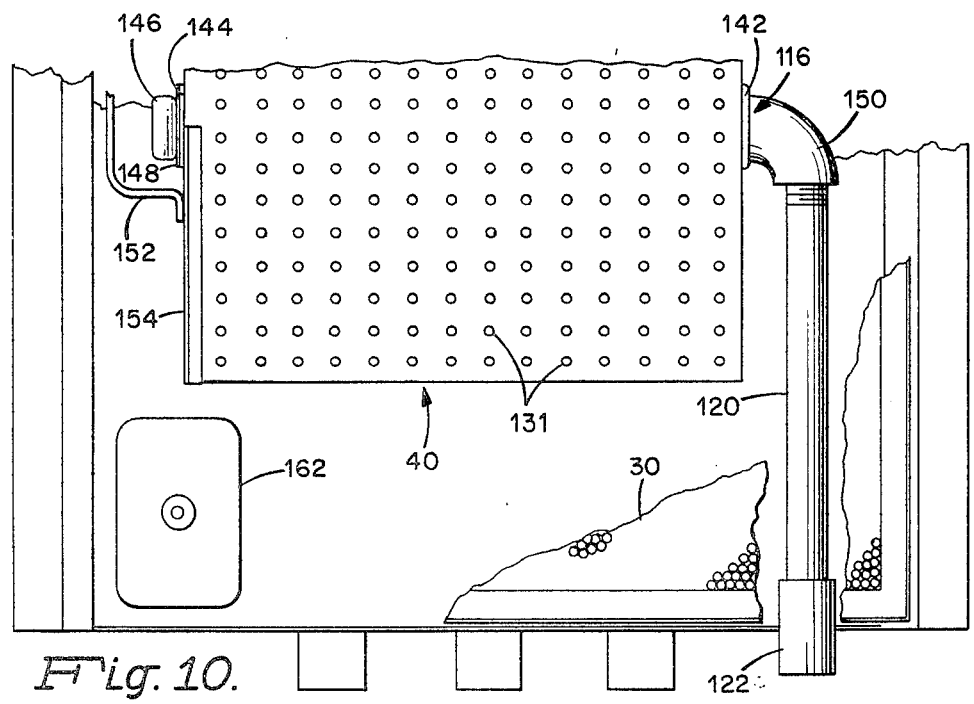
FIG. 10 is a top view, partly broken away, of a fryer according to the invention, illustrating a preferred filter.
Figure 11:
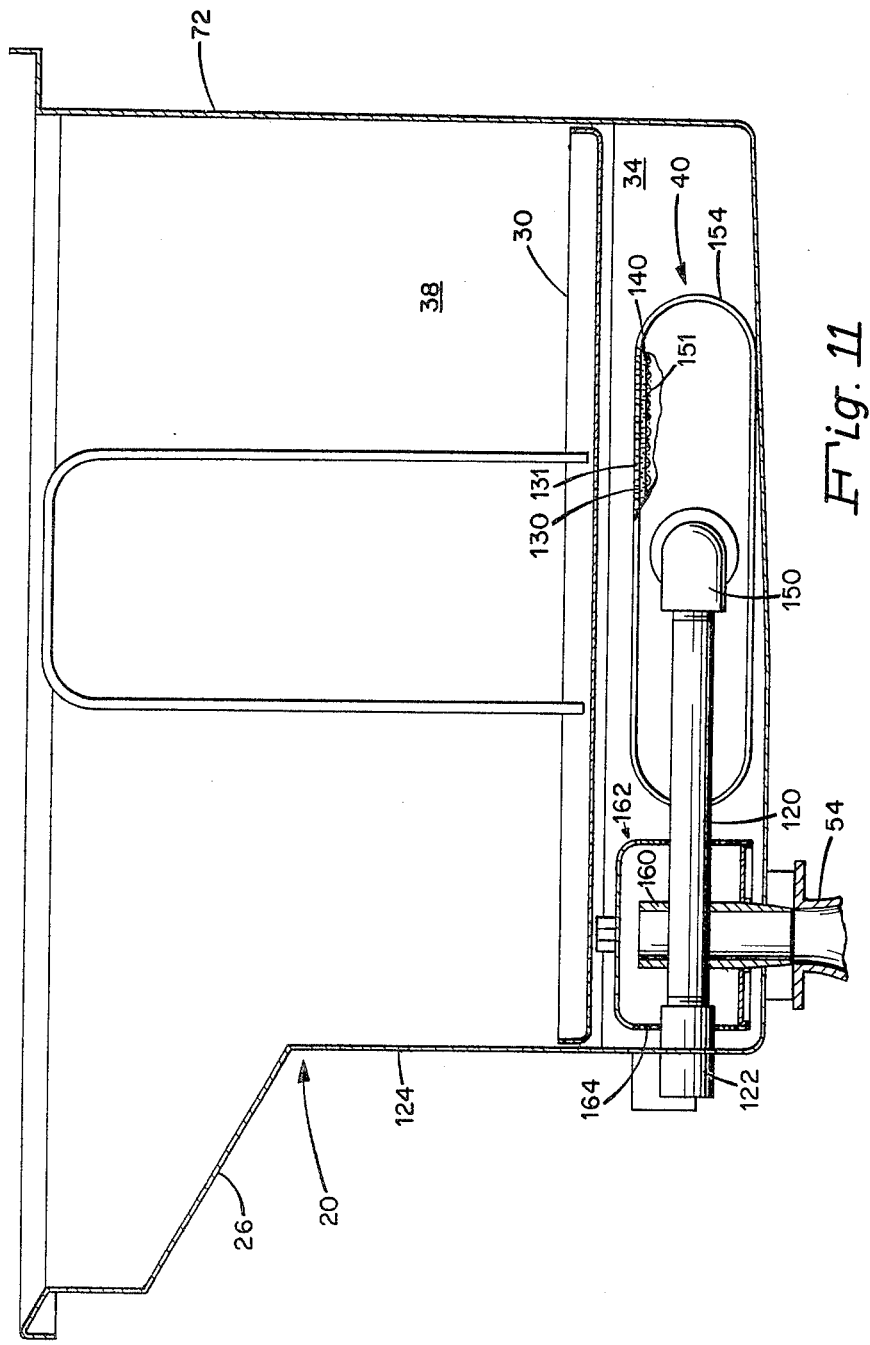
FIG. 11 is a side view of the embodiment shown in FIG. 10.
Figure 12:
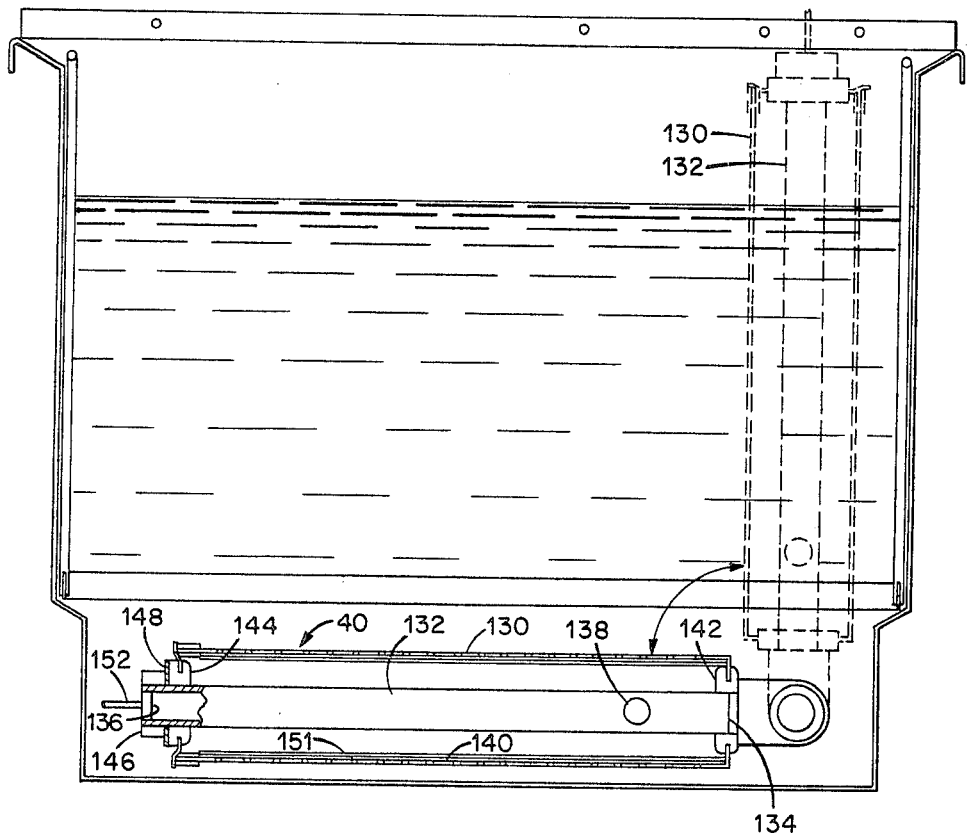
FIG. 12 is an end view of the embodiment shown in FIG. 10 showing the filter both in an operating position and (in broken line form) in an upright position facilitating changing of the filter element.

As is best shown in FIGS. 10-12, the filter 40 comprises a casing 130 with a plurality of perforations 131 through which fat is discharged to the bottom zone 34 of the fry tank. A centrally-located pipe 132 runs along the length of the filter 40 and includes an open end 134 near the filter inlet 116 and a closed end 136 opposite the end 134. The pipe also has at least one discharge opening 138 for permitting flow of fat out of the pipe 132 to the space between the pipe 132 and a filter element 140 positioned adjacent to the inner wall of the casing 130. Seals 142 and 144 surround the pipe 132 at locations of the opposed pipe ends 134 and 136, respectively, at which these pipe ends extend through openings in the casing 130. The closed pipe end 136 has a threaded portion engaged by a lock nut 146 and a washer 148. The nut and washer bear against the seal 144 to hold the casing 130 in position against an elbow 150 at the filter inlet 116.

Any of several materials may be utilized in the filter element 140; candidate materials must, however, be suitable for operation at the temperature of the circulating liquid fat (about 350° F.) and be capable of cleaning the fat without excessive pressure drop or tendency to escape from the filter. One preferred filter element 140 is a carbon-impregnated cloth which can be precut to size and used as a disposable, easily-installable cartridge. In some applications, where excessive discoloration of the fat is the major determinant of fat life, a material such as cotton paper may be a sufficiently effective, low-cost alternative for use as the filter element.

The filter element may be a free-standing cartridge or, as indicated in FIG. 11, the filter may include a screen 151 to hold the filter element 140 in position adjacent to or against the inner wall of the casing 130. The screen 151, which is preferably attached to a casing cover 154, may facilitate replacement of certain filter elements and improve overall removal of particulate matter and fat breakdown products from the circulating fat.

The arrangement of the filter 40 and its location in the bottom zone 34 of the fry tank 20 allow use of a tank of standard size and shape and of simple plumbing connections. Moreover, they permit changing of the filter element 140 without risk of leakage of fat and without draining fat from the tank 20. As is best shown in FIGS. 10 and 12, the filter 40 and its associated conduit 120 are rotatable about the swivel fitting 122 from a generally horizontal (operating) position to a generally vertical position wherein the end of the filter 40 containing the lock nut 146 is above the normal level of fat in the tank 20. Thus to install a new filter element 140, the fryer is turned off and a simple hook (not shown) such as a standard hook supplied with the filter 40 is first used to remove the crumb tray 30. The hook is then engaged with a loop 152 attached to the end of the casing 130 opposite the filter inlet 116, and the filter 40 is rotated to the upright position shown in dashed form in FIG. 12. Upon removal of the lock nut 146 and the washer 148, the casing 130 and seals 142, 144 may be slid upward and out of contact with the pipe 132. The casing cover 154 and the used filter element may then be removed, a fresh filter element installed, and the filter reassembled and repositioned for continued fryer operation.

During operation of the fryer, a portion of the fat circulated by the pump 54 (e.g. about ten percent by volume) is directed through the pipe 66 and the conduit 120 into the filter pipe 132. This fat emerges from the pipe opening 138 and then is forced through the filter element 140 and out of the casing perforations 131 into the bottom zone 34 of the fry tank 20.

The fraction of circulated fat which passes through the filter 40 is governed by the effective resistances in the two return loops, which are determined by the relative sizes and lengths of the pipes 66, 68, and 120 and the heat exchanger coils 94 as well as the flow resistance of the filter 40. In one fryer constructed and tested according to the principles disclosed herein about ninety percent of the circulating fat flowed through the heat exchanger 44 and the remaining ten percent flowed through the filter 40.

The parallel flow arrangement of the filter 40 and the heat exchanger 44, unlike a series arrangement of these components, permits the flow fractions to be varied as required to obtain desired amounts of filtration and heating. Moreover, as mentioned previously, this arrangement permits all or nearly all of the fat withdrawn from the tank 20 to be circulated through the heat exchanger 44 in the event of clogging of the filter 20. This allows normal fryer operation to continue until the time of a normally scheduled shutdown or until loss of filtration leads to fat quality which is unacceptable for further cooking.

Under certain frying conditions, such as immediately following immersion of food of high moisture content into the fat held by the fry tank 20, the pump 54 may entrain substantial amounts of water or steam as it withdraws fat from the tank. Unless measures are taken to avoid or accommodate this moisture, vapor lock may occur within the pump 54, reducing the flow of fat through the heat exchanger 44 and the filter 40 to unacceptably low levels. Entrainment of foam may also be a cause of vapor lock.

One method of accommodating a vapor lock is to restart or recycle the pump after an automatic shutdown is effected by means of a "low flow" control system as described hereinafter. Alternatively, this vapor lock condition may be avoided by limiting the batch size of any high water content foods cooked in the fryer or temporarily reducing pump speed during their initial cooking when release of moisture is greatest. Entrainment of water may be prevented or reduced by the use of baskets 28 with a solid bottom or plate which blocks release of moisture from the bottom of the baskets into fat below the baskets. Moisture is permitted to flow out of the sides and top of the baskets, areas from which moisture may more easily bubble upward and escape from the fryer as steam.

Use of a properly-designed crumb tray 30 in the fry tank 20 has also been found to help prevent vapor lock of the pump 34 by inhibiting migration of moisture from the upper zone 38 of the tank to the bottom zone 34. A crumb tray made from perforated sheet metal of fine mesh and low percentage open area is preferred.

Moisture entrainment may be further inhibited by structures such as the standpipe 160 and the baffle assembly 162 illustrated in FIG. 11. The standpipe 160 blocks entry into the pump 54 of water which may have settled to the bottom of the tank due to its higher density relative to the fat. The cage or baffle assembly 162 enclosing the standpipe 160 helps to shield the standpipe 160 from direct intake of water released by food into the fry zone 38. It is important, however, that the "cage" or baffle assembly 162, if used, have sufficient open area so that, as particles from food being fried accumulate on it, the pressure drop across its inlet openings 164 remains low enough not to impair operation of the pump 54. The combination of the baffle assembly 162 and the standpipe 160 provide an opportunity for moisture to vaporize and escape upward through the fry zone 38 as bubbles or to collect as water at the bottom of the tank 20.

Figure 13:
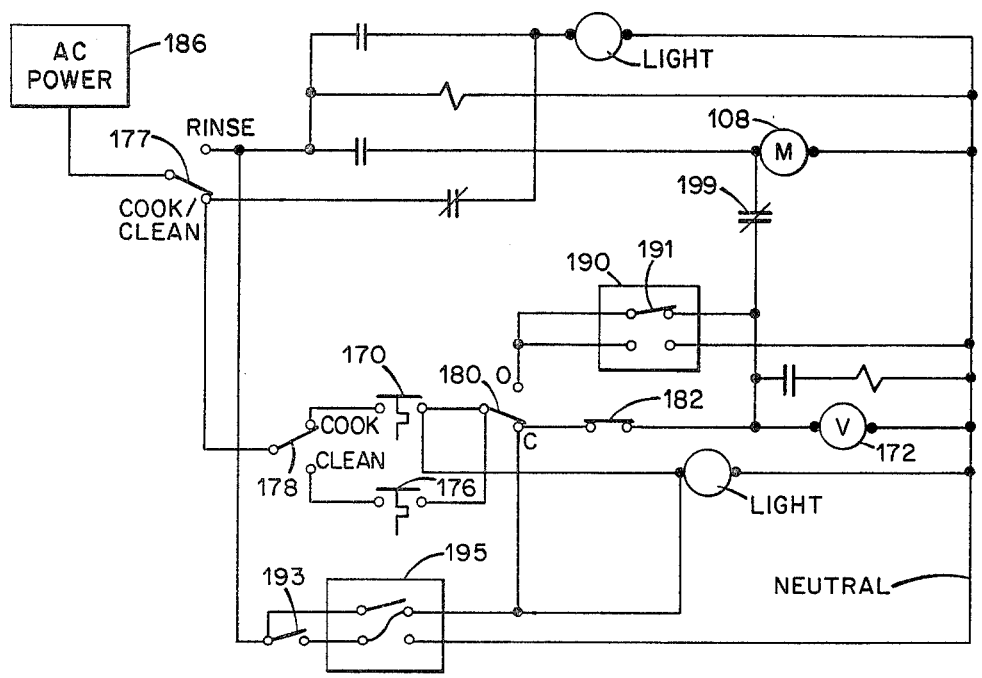
FIG. 13 is a schematic of a control system for the fryer according to the invention.

Control of the fryer is achieved by a system having pressure and temperature sensors which are electrically linked to the burner 50 and the pump 54. An electrical schematic of the fryer control system is given in FIG. 13, and FIGS. 2 and 4 show the locations of major elements used in control of the burner and the pump. Included in the system is a cook thermostat 170 which senses temperature of fat in the tank 20 and maintains this temperature at a desired level by regulating a gas valve 172 in a gas line 174 connected to the burner 50. One or more additional thermostats may be provided such as a limit thermostat 175 (FIG. 2) to shut down the burner 50 and the pump 54 if the temperature of the fat in the tank 20 exceeds a predetermined level such as 380° F., and a "clean mode" thermostat 176 which senses and regulates temperature of a fluid such as a water-based cleaning solution which may be circulated through the fryer during a cleaning cycle. As shown in FIG. 13, the "cook" and "clean" modes of operation may be selected by appropriate positioning of switches 177 and 178.

In addition to the above-described thermostatic controls, a simple arrangement of two sensors permits operation of the burner 50 only when fat flow through the pump 54 is equal to or greater than a prescribed level. This "low flow" control function is desirable to prevent overheating and rapid breakdown of the fat which would result from continued burner operation at low flow rates. Such low flow conditions can exist during normal start-up of the pump 54, or if a vapor lock occurs in the pump, or if the pump motor fails, or if the heat exchanger 44, the pump 54, or their plumbing becomes blocked.

One preferred "low flow" control comprises two pressure switches 180 and 182 (FIGS. 2 and 13) positioned in a single tap 184 at the pump outlet 64 and operable to detect increases or decreases in the static pressure of fat circulated by the pump 54. Two pressure switches are needed because the pressure changes due to clogging or a plumbing blockage downstream of the pressure sensing location are opposite to those which occur if the pump motor 108 fails or the pump 54 suffers a vapor lock or the pump inlet becomes clogged. As is illustrated schematically in FIG. 13, the pressure switches 180 and 182 are electrically connected in series between a power source 186 and the gas valve 172 such that both switches must be closed in order for the gas valve 172 to be open for delivery of fuel gas to the burner 50. Normally open switch 180 is set to close and remain closed only if the static pressure it senses is equal to or greater than a value corresponding to an acceptable flow rate of fat. A vapor lock, failure of the pump motor 108, or clogging of the pump inlet 56 or the sensor line to the switch 180 will act to open the switch 180 and shut off or prevent flow of gas through the valve 172. Normally closed switch 182 remains closed unless the static pressure it senses is equal to or greater than a predetermined value due to a clog in the fat circulation system beyond the pump outlet 64. It should be noted that if the normal flow rate of fat through the heat exchanger 44 is substantially greater than through the filter 40, clogging of the filter 40 will not produce an unacceptably low flow rate of fat so as to open the switch 182. Thus fryer operation may continue with partial or no filtration until the time of a scheduled shutdown.

An alternative "low flow" control includes a temperature sensor 188 in the exhaust (FIG. 4) instead of the second pressure switch 182. The use of a temperature sensor 188 in place of, or in addition to, the switch 182 may be preferable to two pressure switches since it is possible, were downstream clogging accompanied by blockage in the sensor line to the switch 182, that the switch 182 would not sense downstream clogging so as to deenergize the gas valve 172. (The switch 180, on the other hand, will failsafe if blocked—i.e., act to terminate gas flow.)

The fryer control system also includes a pump cycling arrangement operable in conjunction with the "low flow" control and which is used to overcome vapor locks by "burping" bubbles of vapor from the pump 54. As indicated in FIG. 13, this arrangement includes a vapor lock timer 190 connected between the pump motor 108 and the pressure switch 180. In the event of a "low flow" event sensed by the pressure switch 180, the switch 180 moves from a closed (C) position to an open (O) position, closing the gas valve 172. After a brief time interval, a timer switch 191 opens, turning off the pump motor 108 for a selected interval of time such as ten seconds. This releases suction at the pump inlet 56 so that vapor trapped in the pump 54 may escape into the fry tank 20, unblocking the pump. At the end of the time delay, the switch 191 restarts the pump motor 108 for a selected interval such as three seconds. If the vapor lock or other malfunction has been eliminated, pressure at the pump outlet will then increase and switches 180 and 182 will permit gas to flow through the valve 172 for restart of the burner 50 and continued fryer operation. If the pump restart is unsuccessful, the timer 190 will initiate successive "burp" cycles including pump shutdowns and attempted restarts until fryer operation can be continued or other measures are deemed necessary.

Also shown in FIG. 13 is circuitry for operating the fryer in a "rinse" mode and a "dry" mode. Use of a "dry" cycle is desirable to remove residual water from the heat exchanger 44 and other plumbing after draining used fat from the fryer and cleaning the fryer. Removal of this water avoids vapor lock problems of the pump 54 which could occur during fat heat-up or fryer operation were water to remain and thus mix with new fat loaded into the fry tank 20.

The dry cycle is initiated by moving the switch 177 into the "rinse" position and depressing a momentary-closing switch 193, which activates a timer 195. The timer 195 opens the gas valve 172 for a selected time interval such as two minutes, during which the burner 50 fires against the heat exchanger 44 to expel residual rinse water through a drain valve 197.

Rinsing of the fryer, when desired, is accomplished by moving the switch 177 to the "rinse" position, which provides power to the pump motor 108 while excluding power from the rest of the control system by opening a normally-closed contact 199.

Figure 7:
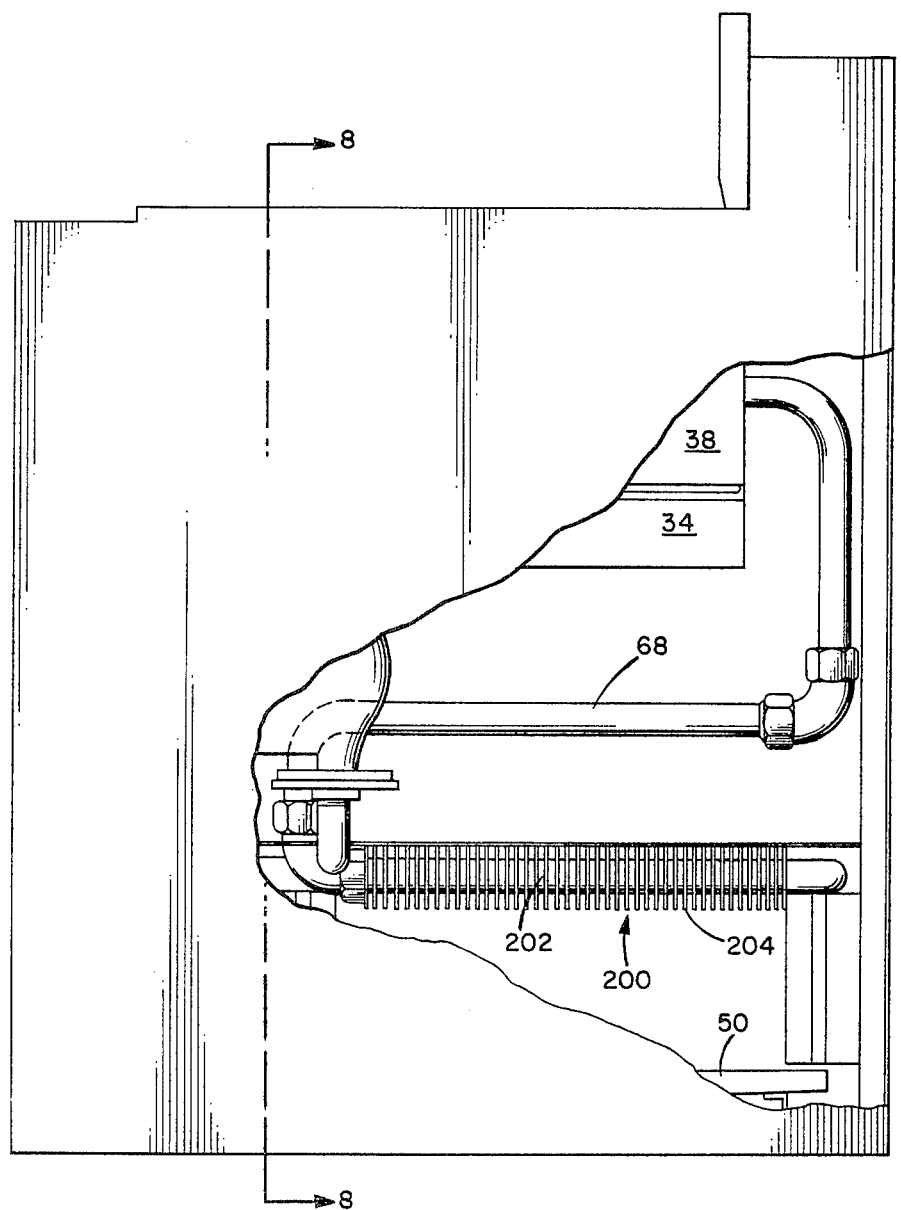
FIG. 7 is a fragmentary side view, similar to that of FIG. 4, but illustrating a fryer having a serpentine heat exchanger.
Figure 8:
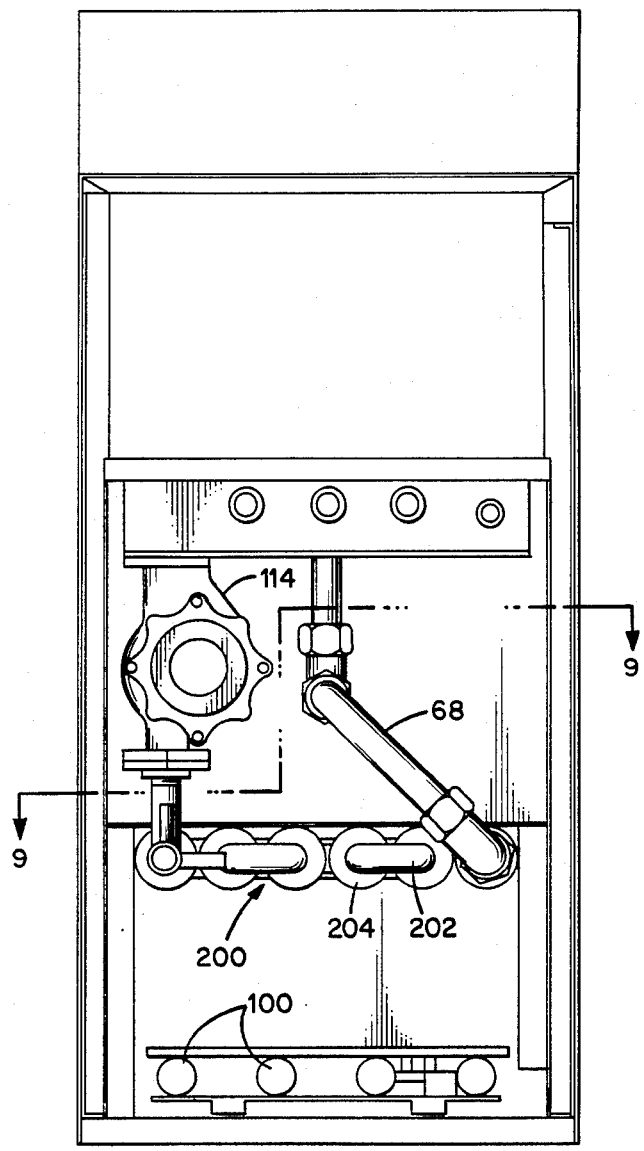
FIG. 8 is a cross-sectional view taken along the line 8—8 of FIG. 7.
Figure 9:
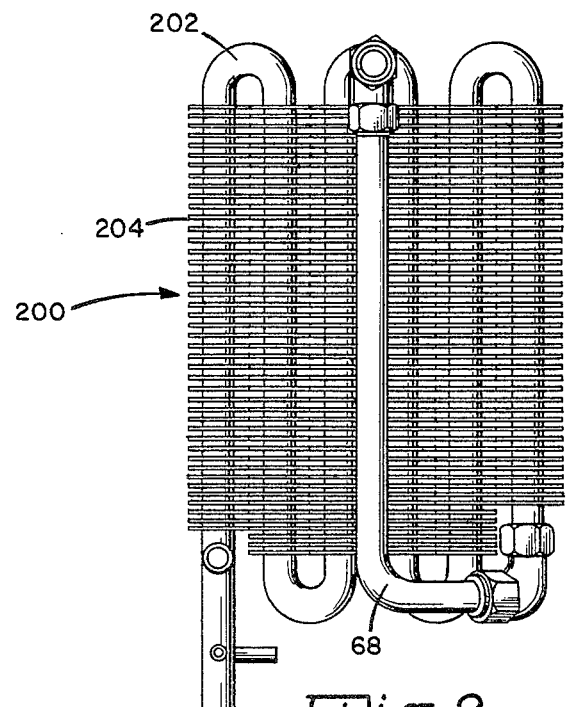
FIG. 9 is a sectional view taken along the line 9—9 of FIG. 8.

FIGS. 7–9 illustrate a fryer similar to those described herein up to this point except that its heat exchanger 200 comprises a serpentine tube 202 instead of the helical or coil-shaped tube illustrated in FIGS. 4–6. The tube 202 is configured as a single-row heat exchanger—i.e., it lies essentially in a plane parallel to the burner 50 and the bottom wall 60 of the fry tank 20. External fins 204 are preferably bonded to, or integral with, the outer surface of the tube 202 to promote heat transfer from the combustion products of the burner 50 to fat circulated through tube heat exchanger tube 202.

In use and operation, the fryer is connected to a source of combustible gas such as natural gas and to a source of electrical power, and the fry tank 20 is filled with fat to a level about in line with the bottom of the inclined shelf 26. If desired, the liquid fat in the tank 20 may be obtained by melting a solid block of fat by cycling the burner 50 and the pump 54 for short, regular intervals or by equipping the fryer with an electrical heating tape located beneath and in good thermal contact with the bottom of the fry tank 20. After sufficient liquid fat is available, the pump 54 is started for a normal frying operation. When a sufficient flow rate of fat is attained, the gas valve 172 opens and the burner 50 is lit. The fat in the tank circulates continuously through the heat exchanger 44 and the filter 40 and quickly attains a level suitable for frying of food.

Efficiency and filtration tests were conducted on commercially available gas-fired fryers and on a fryer constructed in accordance with the invention and having a heat exchanger of serpentine shape. Calorimetric efficiency, determined from the proportion of combustion energy imparted to the fry tank 20, was measured as 74–77 percent in three tests of the fryer of the invention. This is considerable higher than the efficiencies of 56–58 percent measured for the nearest competitor, and 40–45 percent for three other fryers.

Figure 14:
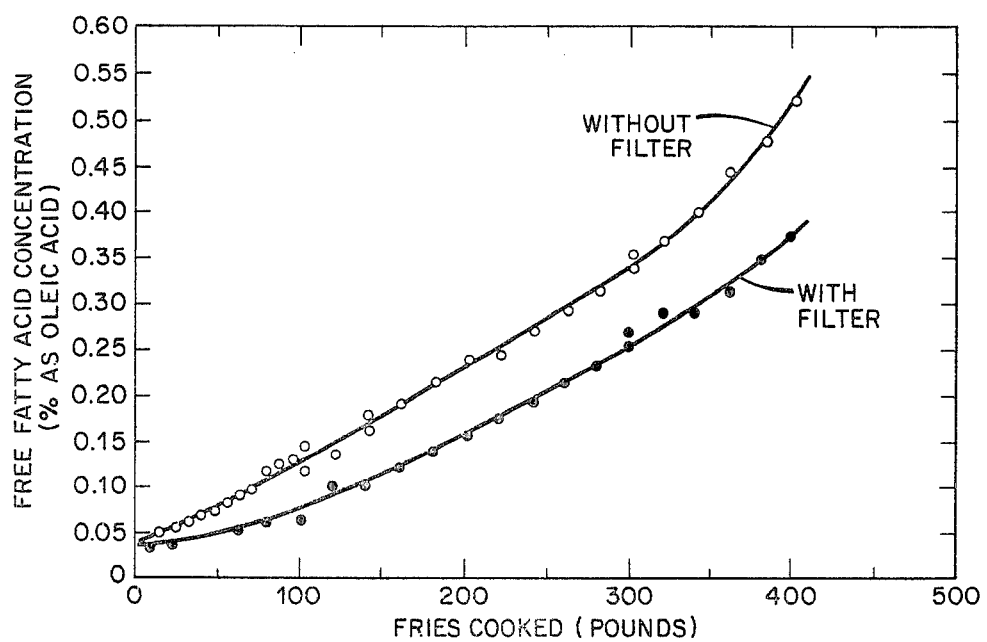
FIG. 14 is a graph with plots of test results showing the effect on fat quality of filtration of fat in the fryer.

The benefit of filtration on fat quality is illustrated in FIG. 14, which shows plots of the concentration of titratable free fatty acids (a standard indicator of fat breakdown) measured in samples of fat taken at regular intervals during two tests in each of which about 400 pounds of potatoes (frozen and blanched French fries) were cooked. In one test, the aforementioned fryer of the invention was used and its filter element was changed after each 100 pounds of French fries were cooked. In the other test no filter was used. The lower concentrations of acids achieved with filtration suggest a distinct benefit of filtration, and it is believed that further performance improvements are obtainable by use of a heavier filter element or a larger filter, or more frequent changes of the filter element.

Tests were also conducted to determine production rates of a fryer constructed in accordance with the invention. Results showed that production rates of about 90 lbs/hour of French fries (starting with frozen fries) were achievable at a natural gas input of about 80,000 BTU/hour. This production rate is considered to be about fifty percent higher than those attained by commercially available fryers.

Although the invention has been shown and described with reference to certain preferred embodiments, it is apparent that the fryer may be embodied in other specific forms without departing from the spirit or essential characteristics of the invention. For example, the fryer may be heated by immersion-type electrical heaters instead of by gas-fired burners; in this form only a single return loop without heat exchanger need be included in the fryer. The scope of the invention is indicated by the appended claims, and all changes which come within the meaning and range of equivalency of these claims are intended to be embraced therein.

What is claimed is:

1. In a deep fat fryer including a tank for holding cooking fat, a filter for filtering the fat, and circulating means for withdrawing fat from the tank and then returning fat to said tank, the improvement wherein said filter is positioned in the bottom of said tank and includes an outer casing having a plurality of holes for discharge of fat, a filter element within said casing, an inlet for receiving fat to be filtered, and lock means for permitting removal and replacement of said filter element, said circulating means includes a return conduit extending through said tank and connected to the inlet of said filter for delivering fat to the filter, said conduit having a swivel joint permitting rotation of said filter from a generally horizontal position to a generally vertical position, and said outer casing of the filter having a length such that upon rotation of the filter to a generally vertical position a portion of said filter including said lock means extends above the normal surface level of said fat.

2. A deep fat fryer as in claim 1 wherein said filter element comprises a carbon-impregnated cloth.

3. A deep fat fryer as in claim 2 wherein said filter element is mounted on a screen adjacent to the inner surface of said outer casing of the filter.

4. A deep fat fryer as in claim 1 wherein said outer casing has a generally flattened, cylindrical shape and an opening in each of its opposed ends, and said filter further comprises:
   a pipe running the length of said casing and extending through said openings in the opposed ends of the outer casing, said pipe including an open end connected to said return conduit, a closed end extending through the opening in the end of said casing opposite the inlet of said filter, and at least one outlet in the portion of the pipe within said casing for outflow of fat from said pipe; and
   a seal around said pipe at said openings in the opposed ends of the outer casing.

5. A deep fat fryer as in claim 4 wherein said lock means includes a fastener removably attached to the closed end of said pipe adjacent to the end of the casing opposite the inlet of said filter; and said seals around the pipe are slidable with said casing along the pipe upon removal of said fastener.

* * * * *